United States Patent [19]

Kato et al.

[11] Patent Number: 4,955,243
[45] Date of Patent: Sep. 11, 1990

[54] MOTION TRANSFORMING APPARATUS

[75] Inventors: Heizaburo Kato, Shizuoka; Masao Nishioka, Fukuroi, both of Japan

[73] Assignee: Sankyo Manufacturing Company, Ltd., Tokyo, Japan

[21] Appl. No.: 346,679

[22] Filed: May 3, 1989

[51] Int. Cl.$^5$ ............................................. F16H 27/04
[52] U.S. Cl. .................................... 74/84 R; 74/569; 267/64.11; 267/64.28
[58] Field of Search ...................... 74/84 R, 112, 569; 267/64.11, 64.28

[56] References Cited

U.S. PATENT DOCUMENTS 4,301,696 11/1981 Andersson ...................... 74/569 X
4,334,437 6/1982 Andersson ............................ 74/53

FOREIGN PATENT DOCUMENTS 60-32058 7/1985 Japan .

Primary Examiner—Allan D. Herrmann
Attorney, Agent, or Firm—Pollock, Vande Sande & Priddy

[57] ABSTRACT

A motion transforming apparatus for transforming a continuous rotary motion of an input shaft into a motion of a predetermined type of an output shaft through a motion transmitting cam device. The fluctuating torque loaded on the input shaft by the motion transmitting cam device is compensated by torque compensating cam device and pneumatic cylinder device for applying a load on the torque compensating cam device. The pneumatic cylinder device includes a cylinder and a piston, and the pressure of the gas in the cylinder compressed or expanded by the reciprocating piston acts on the torque compensating cam device, thereby applying a compensating torque on the input shaft.

10 Claims, 4 Drawing Sheets

MOTION TRANSFORMING APPARATUS

BACKGROUND OF THE INVENTION

The present invention relates to a motion transforming apparatus which transforms a continuous rotary motion of an input shaft into a motion of a predetermined type of an output shaft, for example, a special rotary motion such as an intermittent rotary motion or a swinging motion, or combinations of these special motions combined with each other or with a linear motion.

A motion transforming apparatus generally comprises an input shaft connected with a driving means such as a motor and an output shaft connected with a driven device such as a turn-table or a conveyor, and transforms a continuous rotary motion of the input shaft into a motion of a predetermined type as described above through a motion transmitting cam means for driving the device through the output shaft. In a motion transforming apparatus of the above-mentioned type, there is a problem that the load torque acting on the output shaft ceaselessly fluctuates throughout the operation of the apparatus and the fluctuating reaction torque of the output shaft is delivered to the input shaft as a fluctuating torque. This fluctuating torque loaded on the input shaft becomes great when the apparatus is operated in a high speed, thereby making it difficult to maintain a uniform rotation of the input shaft, and frequently causing vibrations of the apparatus and accompanying operation errors. For compensating this rather great fluctuating torque, a driving means of a large size, which necessiates a great power, or a motion transmitting cam means of a large size is required.

Japanese Patent Publication No. 60-32058 discloses a motion transforming apparatus intended to solve the above-mentioned problem of prior art. In No. 60-32058, apart from the motion transmitting cam means, there is additionally provided a torque compensating cam device, which is connected with the input shaft and adapted to rotate an inertial mass. By virtue of this arrangement, the above-mentioned fluctuating torque acting on the input shaft may be compensated by a compensating fluctuating torque applied on the input shaft by the torque compensating cam means with the inertial mass rotating. This motion transforming apparatus, however, has a disadvantage that, when the fluctuating load acting on the input shaft becomes larger, the size of the inertial mass is required to be accordingly larger, requiring also the apparatus of larger size.

SUMMARY OF THE INVENTION

The object of the present invention is to provide a motion transforming apparatus which can solve the above-mentioned problems of the prior art.

For solving these problems, a motion transforming apparatus of the present invention for transforming a continuous rotary motion of an input shaft into a motion of a predetermined type of an output shaft through a motion transmitting cam means comprises a torque compensating cam means including a cam connected with the input shaft and a cam follower, and a pneumatic cylinder means for applying a torque on the torque compensating means. The pneumatic cylinder means includes a cylinder into which gas is introduced and a piston which is accommodated in the cylinder and connected with the cam follower. The piston is pushed by the gas pressure in the cylinder in such a direction as to make the cam follower contact with the cam surface of the cam, and movable reciprocatingly in the cylinder as compressing and expanding the gas. The fluctuating torque applied on the input shaft by the torque compensating cam means and pneumatic cylinder means is adapted to compensate the fluctuating torque loaded on the input shaft by the motion transmitting cam means.

DESCRIPTION OF THE PREFERRED EMBODIMENT

Figure 1:
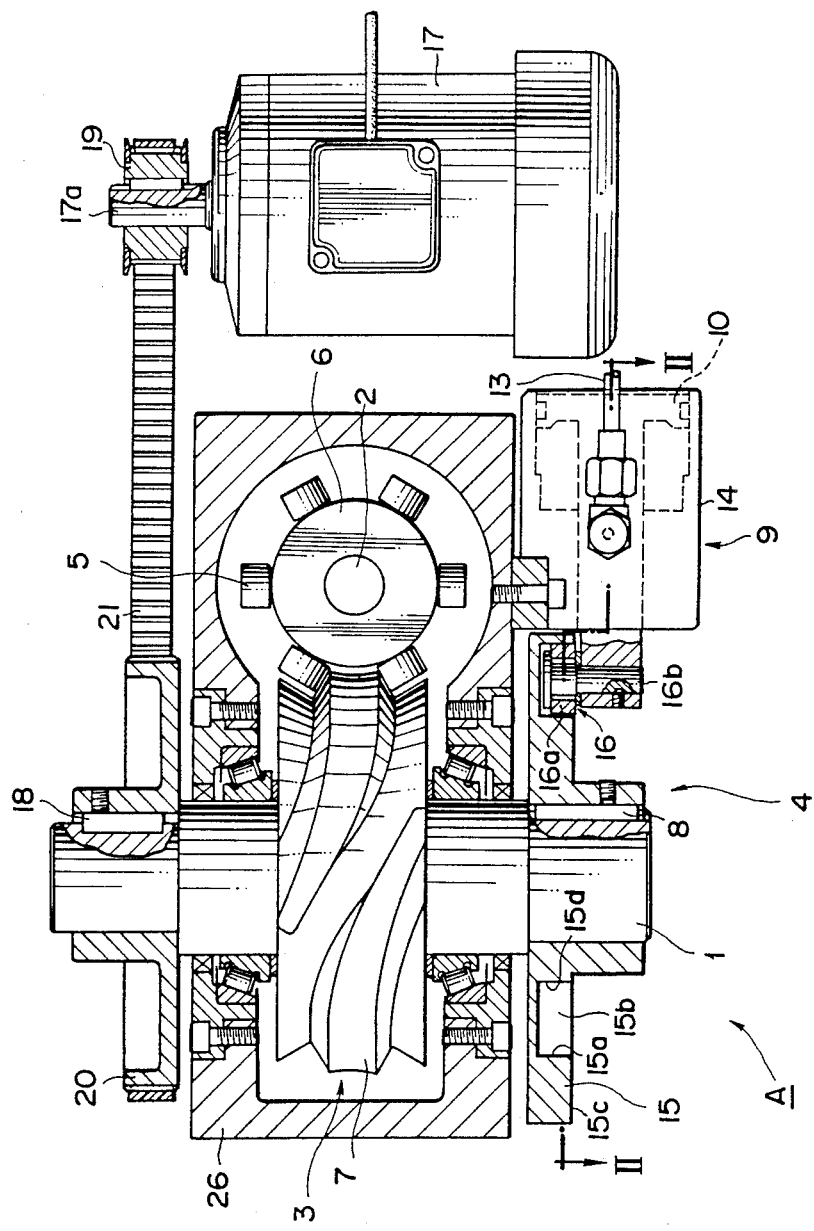
FIG. 1 is a partially sectional plan view of a motion transforming apparatus according to a first embodiment of the present invention.
Figure 2:
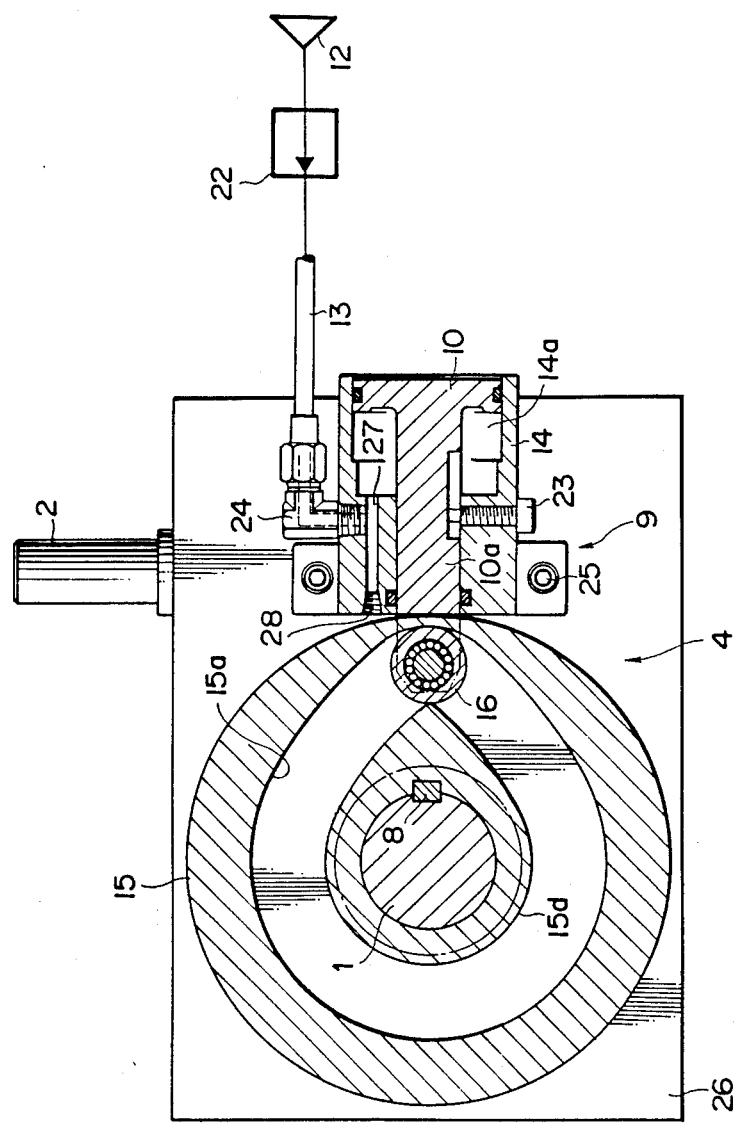
FIG. 2 is a partially sectional elevation view of a motion transforming apparatus shown in FIG. 1.

Referring to FIGS. 1 and 2, a motion transforming apparatus A according to a first embodiment of the present invention is an apparatus for transforming a continuous rotary motion of an input shaft 1 driven by a driving means or a motor 17 into an intermittent rotary motion of an output shaft 2 through a motion transmitting cam means 3. Motor 17 and input shaft 1 are functionally connected with each other by means of a pulley 19 secured to a rotary shaft 17a of motor 17, a pulley 20 secured to input shaft 1 through a fitting member 18, and a belt 21 enveloping these two pulleys. Thus, input shaft 1 is continuously rotated by motor 17. Motion transmitting cam means 3 includes a driving member composed of a three-dimensional cam 7 which is a roller gear cam in this embodiment connected with input shaft 1, and a driven member composed of a turret 6 mounted with a plurality of cam followers 5, each of which successively engages with the three-dimensional cam 7 at the periphery of the turret. Output shaft 2 is fixed to the central portion of turret 6.

The motion transforming apparatus A further includes a torque compensating cam means 4 and a pneumatic cylinder means 9 for applying a load on torque compensating cam means 4. The torque compensating cam means 4 includes a cam 15, as a driving member, secured to input shaft 1 through a fitting 8, and a cam follower 16, as a driven member, engaging with a cam surface 15a of cam 15. The pneumatic cylinder means 9 is provided with a cylinder 14 disposed at the right side of and adjacent to the periphery of cam 15 and defining a working room 14a into which a compressed air is introduced from an air inlet 12 through a pipe 13, and a piston 10 accommodated in working room 14a of cylinder 14 and reciprocatingly movable in working room 14a in a direction perpendicular to the axis of cam 15. On the way of pipe 13, there is arranged a pressure adjusting means 22 for adjusting the load to be applied on torque compensating cam means 4.

In the shown embodiment, cam 15 of torque compensating cam means 4 is a disc-shaped cam fixed to input shaft 1 at its central portion and formed with a recess 15b opening outwards (downwards in FIG. 1) on its outer surface 15c. The recess 15b includes an output circumferential continuous surface 15a and an inner circumferential continuous surface 15d, the outer surface defining the before-mentioned cam surface 15a. On the other hand, the cam follower 16 is a single roller follower composed of a roller 16a rollingly contacting with cam surface 15a and a center shaft 16b rotatably supporting the roller 16a. The center shaft 16b is connected with and supported by a rod 10a of piston 10 of pneumatic cylinder means 9. The piston 10 is continuously pushed rightwards by the pressure of the air introduced into working room 14a of cylinder 14, thereby maintaining cam follower 16 always in contact with cam surface 15a of cam 15.

Piston 10 is prevented from rotating in cylinder 14 by means of a bolt 23, while cylinder 14 is secured to housing 26 by means of a bolt 25. Further, in the figure are shown a nipple 24 and a plug 28 for closing an end portion of an air passage 27 drilled in cylinder 14.

In the above-mentioned motion transforming apparatus, input shaft 1 and three-dimensional cam 7 fixed to the input shaft of motion transmitting cam means 3 are continuously rotated together by motor 17, and the continuous rotary motion of input shaft 1 is transformed into an intermittent rotary motion of turret 6 and output shaft 2 fixed to the turret by means of an engagement of three-dimensional cam 7 with cam follower 5. The transformed intermittent rotary motion of output shaft 2 is delivered to some driven element such as a turn-table or a conveyor not shown. Further, the cam 15 of torque compensating cam means 4 continuously rotates together with input shaft 1, and the rotary motion of cam 15 is transformed into a reciprocating motion of piston 10 in cylinder 14 through an engagement between cam 15 and cam follower 16. The reciprocating motion of the piston compresses and expands the air introduced into and confined in working room 14a of cylinder 14. By virtue of this reciprocating motion of the piston 10, resultant fluctuating torque acting on input shaft 1 in operation of the motion transforming apparatus is minimized.

The torque compensating function according to the present invention will be described below.

During an operation of transforming a continuous rotary motion of input shaft 1 into a intermittent rotary motion of output shaft 2 through motion transmitting cam means 3, and of delivering the motion of output shaft 2 to a driven element, the output shaft 2 receives fluctuating load or torque resulting from frictional resistances of various contacting members and especially from an inertial mass of the driven element. This fluctuating torque on shaft 2 is transmitted to input shaft 1 as a reaction torque. This fluctuating torque acting on shaft 1 disturbs a uniform rotation of shaft 1 and frequently causes vibrations and working errors of the apparatus. For compensating the above-mentioned fluctuating torque, a driving means having a great power or a motion transmitting cam means of a large size is required in general. However, in the embodiment shown, the fluctuating torque loaded on input shaft 1 from output shaft 2 or a driven element is compensated by the fluctuating torque applied on input shaft 1 by means of torque compensating cam means 4 which includes a reciprocating piston for compressing and expanding the air in working room 14a, resulting in a substantially zero resultant fluctuating torque acting on input shaft 1.

In designing the above-mentioned motion transforming apparatus A, the constituent members of the apparatus are dimensioned so that the fluctuating torque $Q_1$ loaded on shaft 1 through motion transmitting cam means 3 and the fluctuating torque $Q_2$ applied on shaft 1 through torque compensating cam means 4 compensate each other. It is widely known to estimate the fluctuating torque loaded on shaft 1 in case of using a cam for producing an intermittent rotary motion, and it is considered simple for those skilled in the art to design the constituent members of the apparatus under a design condition that the resultant of the fluctuating torques $Q_1$ and $Q_2$ should be zero. The design process is briefly outlined hereinafter. Assuming that the above-mentioned fluctuating torque $Q_1$ is a resultant torque of a torque due to an inertial mass of a driven element, a torque due to frictional forces and a torque due to viscosity, and the fluctuating torque $Q_2$ is a torque due to the compressed and expanded air produced by pneumatic cylinder means 9, the following equations (1) and (2) are obtained.

$$Q_1 = \frac{m_1(A_1 \times V_1)}{\theta_1} r_1 + \frac{C_1 V_1^1}{\theta_1} r_2 + \frac{K_1}{\theta_1}(S_1 \times V_1) r_3 + \frac{F_{01} + F_{f1} + F_{g1}}{\theta_1} V_1 \cdot r_4 \quad (1)$$

$$Q_2 = \frac{K_2(S_2 \times V_2)}{\theta_2} r_5 \quad (2)$$

Since equations (1) and (2) are usually used for calculating fluctuating torques acting on input shaft for an intermittently driving mechanism, detailed description therefor is omitted here, but physical definitions of the parameters used in the equations are described as follows:

| | |
|---|---|
| $A_1, V_1, S_1$: | Acceleration, velocity, and displacement of output shaft 2 of motion transmitting cam means 3, respectively, |
| $m_1$: | inertial mass of driven element, |
| $C_1$: | viscous resistance coefficient, |
| $K_1$: | spring constant, |
| $F_{01}$: | initial tension of spring, |
| $F_{f1}$: | frictional force, |
| $F_{g1}$: | gravitational force, |
| $\theta_1, \theta_2$: | index angles (rotation angles of input shaft 1 corresponding to one indexing movement of output shaft 2) |
| $K_2$: | spring constant of compressed air, |
| $V_2, S_2$: | velocity and displacement of piston 10 of pneumatic cylinder means 9, |
| $r_1 \sim r_5$: | moment arm lengthes. |

For designing the motion transforming apparatus A, rotary speed of input shaft 1, motion shape or type of output shaft 2 and structures of motion transmitting cam means 3 are firstly determined taking in consideration type and inertial mass of the driven element in a manner similar to that used in prior art for an intermittent motion transformation. When these items have been determined, the parameters appearing in equation (1) can be calculated.

Next, torque compensating cam means 4 and pneumatic cylinder means 9 are designed so as to minimize a difference $Q_3$ (non-conservative torque) between the fluctuating torques $Q_1$ and $Q_2$. Namely, the following equations (3) and (4) should be satisfied.

$$Q_1 - Q_2 = Q_3, \quad Q_3 << Q_1 \qquad (3)$$

$$\frac{m_1(A_1 \times V_1)}{\theta_1} r_1 + \frac{C_1 V_1^2}{\theta_1} r_2 + \frac{K_1}{\theta_1}(S_1 \times V_1) r_3 + \qquad (4)$$

$$\frac{F_{01} + F_{f1} + F_{g1}}{\theta_1} V_1 \cdot r_4 - \frac{k_2}{\theta_2}(S_2 \times V_2) r_5 = Q_3$$

In case the three-dimensional cam 7 of motion transmitting cam means 3 and the cam 15 of torque compensating cam means 4 are both secured to the same input shaft 1, and rotate together with the input shaft to mark the fluctuating torque applied to input shaft 1 zero, $\theta_1$ becomes equal to $\theta_2$. In this case, equation (4) can be simplified into the following equation (5).

$$m_1(A_1+V_1)r_1+C_1V_1^2r_2+k_1(S_1\times V_1)r_3$$
$$+(F_{01}+F_{f1}+F_{g1})V_1 \cdot r_4-K_2(S_2\times V_2)r_5=Q_3 \qquad \ldots (5)$$

In equation (5), parameters $A_1$, $V_1$, $S_1$, $m_1$, $C_1$ $k_1$, $F_{01}$, $F_{f1}$ and $F_{g1}$ have been already determined, and the values of $V_2$, and $S_2$ which is an integrated value of $V_2$, can be determined by selecting a suitable $K_2$ value so as to satisfy a relation $Q_3 < Q_1$, i.e. to minimize the $Q_3$ value.

Based on these values $K_2$, $V_2$ and $S_2$, the constituent members of torque compensating cam means 4 and pneumatic cylinder means 9 can be designed.

Although the fluctuating torque loaded on input shaft 1 from motion transmitting cam means 3 is composed, as before-mentioned, of torques due to inertial load, frictional load, viscous load and the like, the torque due to inertial load becomes predominant in case of a high speed revolution, and substantially determines the value of the fluctuating torque, which should be compensated by a torque applied on input shaft by means of torque compensating cam means 4 and pneumatic cylinder means 9. In a physical expression, the kinetic energy of reciprocating piston 10 produced through torque compensating cam means 4 is transformed into an energy of the compressed and expanded air in working room 14a. This air energy is equivalent to a potential energy and has the same dimension. In other words, the torque compensating cam means 4 and the pneumatic cylinder 9 obviously constitute an energy conservative dynamic system where the law of energy conservation is maintained. In consequence, the torque due to an inertial load, which belongs to the conservative system, can be compensated, while the torques due to frictional load or viscous load, which belong to a non-conversative system, can not be compensated.

As before-mentioned, the pneumatic cylinder means 9 of the shown embodiment is provided with a pressure adjusting means 22 for adjusting the air pressure in the working room 14a. By virtue of this arrangement, when the amount of the fluctuating torque loaded on input shaft 1 through motion transmitting cam means 3 is changed, the air pressure in the working room 14a can be adjusted according to the changed amount of torque, thereby making it possible to suitably compensate the fluctuating torque due to an inertial load by means of torque compensating cam means 4 and pneumatic cylinder means 9. Namely, when the revolution speed of input shaft 1 increases and the fluctuating torque acting on input shaft 1 due to inertial load accordingly increases, the air pressure in working room 14a is also increased by means of pressure adjusting means 22, thereby suitably compensating the increased torque due to inertial load.

Figure 3:
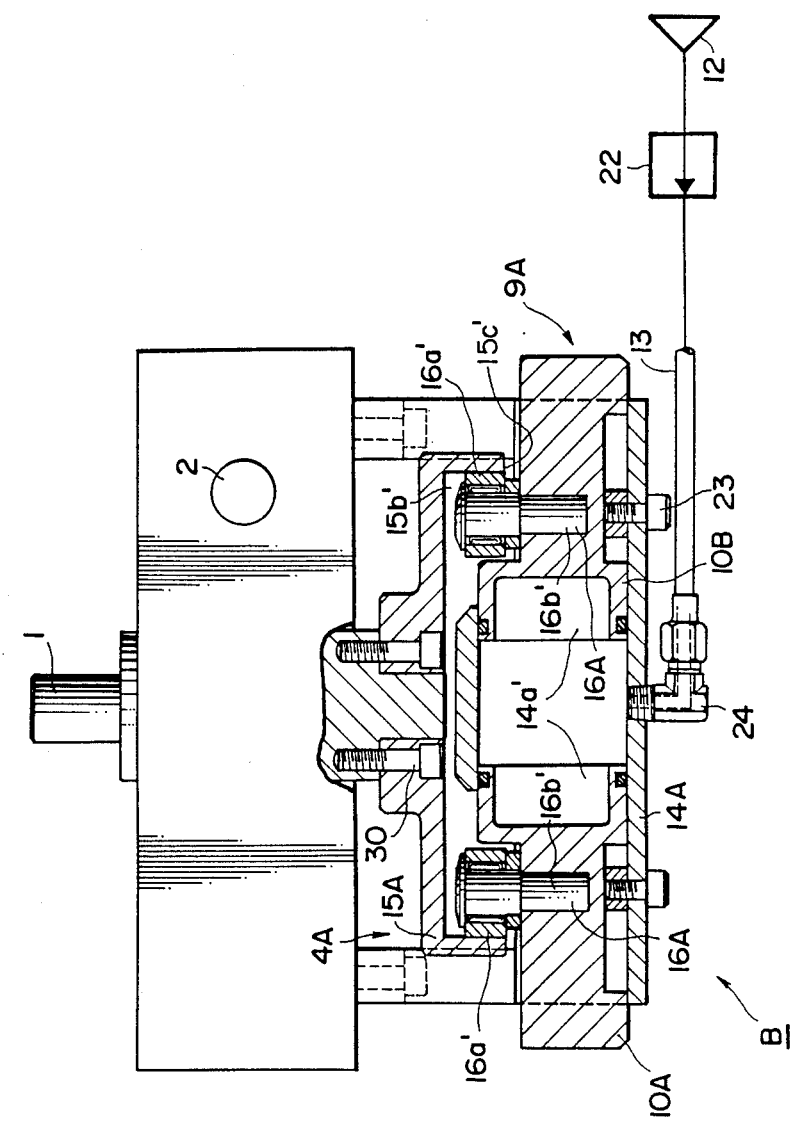
FIG. 3 is a partially sectional plan view of a motion transforming apparatus according to a second embodiment of the present invention.
Figure 4:
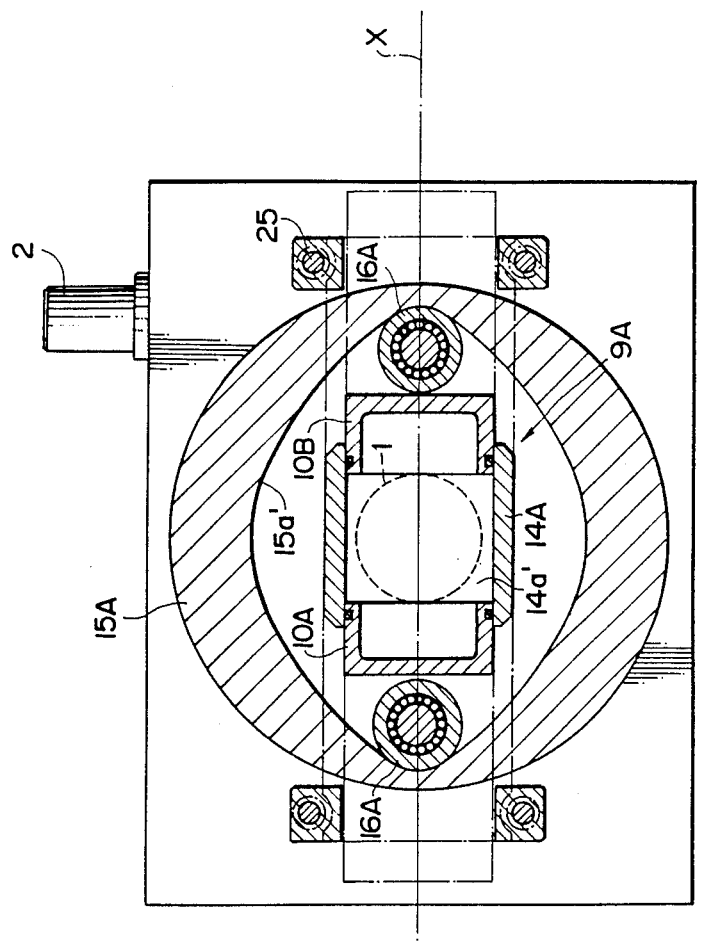
FIG. 4 is a partially sectional elevation view of a motion transforming apparatus shown in FIG. 3.

FIGS. 3 and 4 show a second embodiment of the present invention, where the structures of the torque compensating cam means and the pneumatic cylinder means are modified. In this embodiment, a cam 15A of a torque compensating cam means 4A has a disc-shape having a center axis coincide with the axis of input shaft 1, and is secured to input shaft 1 through bolts 30. Cam 15A is formed on outer surface 15c' with a recess 15b' opening outwards (downwards in FIG. 3). This recess 15b' has a circumferentially and continuously extending outer surface, profile of which is symmetrical about a horizontal (in FIG. 4) plane X including the axis of input shaft 1. This outer surface defines a cam surface 15a'. On the other hand, cam follower 16A of torque compensating cam means 15A include two roller followers which rollingly contact with cam surface 15a' at positions separated from each other by 180 degrees. Each of the cam followers 16A is composed of a roller 16a' and a center shaft 16b' rotatably supporting roller 16a'.

A pneumatic cylinder means 9A comprises a cylinder 14A disposed outside of and opposite to the cam 15A, and two pistons 10A, 10B accommodated in cylinder 14A and located at positions apart from the axis of input shaft 1 with equal distances and in opposite directions (leftward and rightward in FIGS. 3 and 4). Pistons 10A, 10B are connected with center shaft 16b' and support cam followers 16A, respectively. Two pistons 10A, 10B define a working room 14a' therebetween, into which a compressed air is introduced through an air inlet 12 and a pipe 13. Pistons 10A, 10B are pushed by the air pressure in working room 14a' so as to separate from each other in opposite directions, thereby pressing cam followers 16A on cam surface 15a'.

The apparatus of the second embodiment functions under the same principle as in the first embodiment. Namely, the torque compensating cam means 4A and the pneumatic cylinder means 9A are adapted to apply a fluctuating torque on input shaft 1 which compensates a fluctuating torque loaded on input shaft 1 when a continuous rotary motion of input shaft 1 is transformed into an intermittent rotary motion of output shaft 2 through the motion transmitting cam means 3. Further, in the second embodiment, pistons 10A, 10B are located at left and right sides of input shaft 1, respectively, and move symmetrically rightwards and leftwards. Namely, in response to rotation of can 15A, the pistons move in opposite directions by the same distance. In consequence, there is obtained a dynamic balance in operation, resulting in a smooth operation of the apparatus. Since, in the second embodiment, profile of cam surface 15a' is symmetrical about plane X as before-mentioned, the second embodiment is suitably applied to an apparatus in which the fluctuating torque loaded on input shaft 1 through motion transmitting cam means has a load pattern repeated every 180 degrees of rotation of input shaft 1.

The elements of the second embodiment other than described above are substantially identical to those of the first embodiment, and the same reference numbers are used for the same members in the both embodiments.

As described above, according to the present invention, a fluctuating torque loaded on input shaft in a motion transforming operation can be suitably compensated by means of a torque compensating cam means and a pneumatic cylinder means. In consequence, vibrations and fabrication errors of the apparatus can be significantly decreased without increasing the size and the driving power of the apparatus.

What is claimed is:

1. A motion transforming apparatus for transforming a continuous rotary motion of an input shaft into a motion of a predetermined type of an output shaft through a motion transmitting cam means, comprising:

torque compensating cam means including a cam connected to said input shaft and cam follower means, and pneumatic cylinder means for applying load on said torque compensating cam means, said pneumatic cylinder means including a cylinder into which gas is introduced, and piston means accommodated in said cylinder and connected with said cam follower means, said piston means being adapted to be pushed by the pressure of said gas introduced into the cylinder in such a direction as to maintain said cam follower means in contact with a cam surface of said cam and being movable reciprocatingly in the cylinder for compressing and expanding said introduced gas, and wherein a fluctuating torque applied on said input shaft by the operation of said torque compensating cam means and the accompanying reciprocal motion of the piston in the cylinder compensate a fluctuating torque loaded on the input shaft by said motion transmitting cam means when the motion of the input shaft is transformed into the motion of the output shaft through the motion transmitting cam means.

2. A motion transforming apparatus as claimed in claim 1, wherein said pneumatic cylinder means comprises pressure adjusting means for adjusting the gas pressure in the cylinder.

3. A motion transforming apparatus as claimed in claim 1, wherein said cam of the torque compensating cam means is a disc-shaped cam which is formed with a recess opening outwards and having a circumferentially and continuously extending outer surface defining said cam surface, and wherein said cam follower means includes a single roller follower rollingly contacting with said cam surface, and said piston means includes a single piston connected with the center shaft of said roller follower.

4. A motion transforming apparatus as claimed in claim 1, wherein said cam of the torque compensating cam means is a disc-shaped cam which is formed with a recess opening outwards and having a circumferentially and continuously extending curved outer surface having a profile symmetrical about a plane including an axis of the input shaft and defining and wherein said cam surface, said cam follower means includes two roller followers rollingly contacting with said cam surface at two positions separated by 180 degrees from each other, and said piston means includes two pistons connected with the center shafts of said roller followers and moved reciprocally in opposite directions.

5. A motion transforming apparatus as claimed in claim 1, wherein said motion transmitting cam means comprises a three-dimensional cam connected with the input shaft and a turret connected with the output shaft and mounted with a plurality of cam followers successively engaging with said three-dimensional cam at the periphery of the turret, and adapted as to transform a continuous rotary motion of the input shaft into an intermittent rotary motion of the turret through said three-dimensional cam, and to take out an intermittent rotary motion from the output shaft.

6. A motion transforming apparatus as claimed in claim 2, wherein said cam of the torque compensating cam means is a disc-shaped cam which is formed with a recess opening outwards and having a circumferentially and continuously extending outer surface defining said cam surface, and wherein said cam follower means includes a single roller follower rollingly contacting with said cam surface, and said piston means includes a single piston connected with the center shaft of said roller follower.

7. A motion transforming apparatus as claimed in claim 2, wherein said cam of the torque compensating cam means is a disc-shaped cam which is formed with a recess opening towards and having a circumferentially and continuously extending curved outer surface having a profile symmetrical about a plane including an axis of the input shaft and defining and wherein said cam surface, said cam follower means includes two roller followers rollingly contacting with said cam surface at two positions separated by 180 degrees from each other, and said piston means includes two pistons connected with the center shafts of said roller followers and moved reciprocally in opposite directions.

8. A motion transforming apparatus as claimed in claim 2, wherein said motion transmitting cam means comprises a three-dimensional cam connected with the input shaft and a turret connected with the output shaft and mounted with a plurality of cam followers successively engaging with said three-dimensional cam at the periphery of the turret, and adapted to transform a continuous rotary motion of the input shaft into an intermittent rotary motion of the turret through said three-dimensional cam, and to take out an intermittent rotary motion from the output shaft.

9. A motion transforming apparatus as claimed in claim 3, wherein said motion transmitting cam means comprises a three-dimensional cam connected with the input shaft and a turret connected with the output shaft and mounted with a plurality of cam followers successively engaging with said three-dimensional cam at the periphery of the turret, and adapted to transform a continuous rotary motion of the input shaft into an intermittent rotary motion of the turret through said three-dimensional cam, and to take out an intermittent rotary motion from the output shaft.

10. A motion transforming apparatus as claimed in claim 4, wherein said motion transmitting cam means comprises a three-dimensional cam connected with the input shaft and a turret connected with the output shaft and mounted with a plurality of cam followers successively engaging with said three-dimensional cam at the periphery of the turret, and adapted to transform a continuous rotary motion of the input shaft into an intermittent rotary motion of the turret through said three-dimensional cam, and to take out an intermittent rotary motion from the output shaft.

* * * * *